F. Hainsworth,
Rotary Blower.

No. 53,609.   Patented Apr. 3, 1866.

Witnesses:
S. B. Gookins
S. C. Child

Inventor:
Frederick Hainsworth

UNITED STATES PATENT OFFICE.

FREDERICK HAINSWORTH, OF CHICAGO, ILLINOIS.

IMPROVEMENT IN ROTARY BLOWERS.

Specification forming part of Letters Patent No. 53,609, dated April 3, 1866.

*To all whom it may concern:*

Be it known that I, FREDERICK HAINSWORTH, of the city of Chicago, in the county of Cook and State of Illinois, have invented a new and useful Improvement in Blowing Apparatus; and I do hereby declare that the following is a full, clear, and exact description of the same, reference being had to the accompanying drawings and the letters and figures marked thereon, which form part of this specification.

The nature of my said invention consists in a novel arrangement of a series of bellows, whereby the same are successively and in rotation filled with air, and the air in like manner is successively and in rotation expelled therefrom automatically, thereby producing a steady and uniform pressure or current of air for any desired purpose, as hereinafter described.

The particular use which I propose to make of this invention is to produce a uniform and steady current of air through carbureting apparatus, for combining hydrocarbon vapor with atmospheric air for illuminating or heating purposes, and also to produce a regular and uniform pressure of the inflammable mixture at the burners. The said uniform pressure or current is produced by arranging a series of bellows radially with respect to a central tube, having their discharge-valves opening toward the center, so that by revolving said series of bellows the bellows are successively filled and discharged into the pipe through which the current is forced, one of said bellows commencing to discharge before the preceding one has completed its discharge, thus rendering the current and pressure continuous and uniform by a continuous and uniform revolution of the apparatus.

To enable those skilled in the art to understand how to construct and use my invention, I will now proceed to describe the same with particularity, making reference in so doing to the aforesaid drawings, in which—

Figure 1:
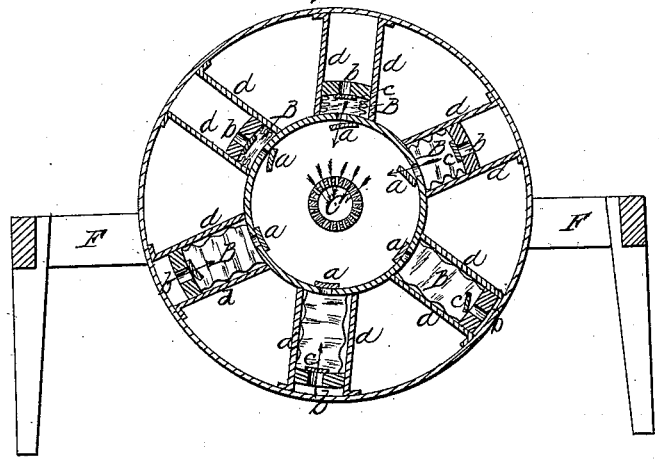
Figure 2:
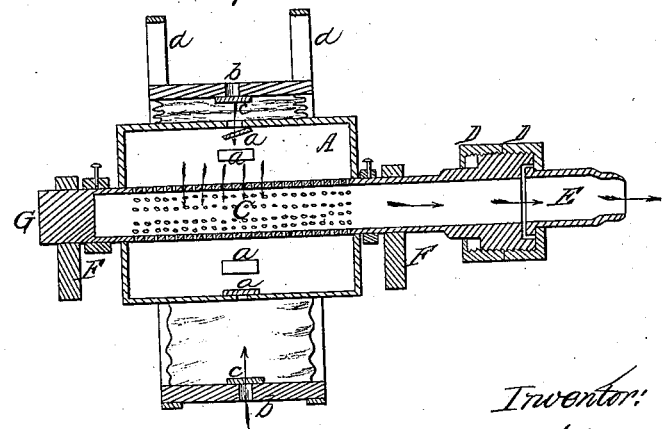

Figure 1 represents a transverse sectional view of my invention; Fig. 2, a longitudinal central section of the same.

Similar letters of reference in the several figures denote the same parts of my invention.

A represents a close cylindrical vessel or chamber, with the hollow shaft or tube C passing axially through the same, and the ends thereof serving for a journal to support said cylinder upon the frame F in suitable bearings, so as to permit said hollow shaft and said cylinder to revolve freely, as hereinafter mentioned, and also for the purposes hereinafter described. Said tube C is closed at one end, as shown, and that part within the said chamber A is perforated with numerous holes for the admission of air, as hereinafter set forth. Upon the exterior surface of the said cylindrical chamber A there are arranged a series of bellows, consisting of any suitable number, (marked B,) one end of the flexible bags or pouches of the bellows being attached upon or to the cylinder and the other end to a heavy block, as shown, there being a suitable opening through said block, provided with a valve, as shown, and also a similar aperture and valve through and within the cylinder A. Upon each side of each of said bellows, at the ends thereof, are the guides $d$, within which said bellows contract or expand, as hereinafter mentioned.

D D' represent a removable coupling or revolving union for the purpose of attaching to the revolving tube C the stationary continuation E, as shown.

The above-described apparatus may be revolved by means of weights, springs, or any other suitable means, and with any required velocity according to the amount of pressure required.

Having described the nature and construction of my invention, I will now proceed to describe its operation.

As the apparatus is revolved the heavy blocks attached to the bellows, as aforesaid, below the center of the apparatus, draw down the flexible sack, and the air passes into the bellows through the aperture $b$, as indicated by red exterior arrows. As the inflated bellows ascend with the revolution of the apparatus above the center, the said blocks slide down within the guides $d\,d$, the valves $c$ being closed by the pressure, thereby forcing the air within the bellows into the cylindrical chamber A and tube C, as shown by the red interior arrows.

There should be a sufficient number of bellows in the series, so that there will be two or more discharging into the cylinder A and tube C at the same time.

Having described the construction and operation of my invention, I will specify what I claim and desire to secure by Letters Patent:

1. The employment of a rotary series of bellows, when arranged and operating substantially as herein described.

2. In combination therewith, the hollow shaft or tube with the removable coupling, when operated for the purpose herein specified and shown.

FREDERICK HAINSWORTH.

Witnesses:
S. B. GOOKINS,
R. W. BRIDGE.